US 10,509,176 B2

(12) United States Patent
Cruz

(10) Patent No.: US 10,509,176 B2
(45) Date of Patent: Dec. 17, 2019

(54) DEFORMABLE MIRROR AND CAPACITIVE ACTUATOR ARRAY CONTROLLER

(71) Applicant: Pedro Godoy Cruz, Palo Alto, CA (US)

(72) Inventor: Pedro Godoy Cruz, Palo Alto, CA (US)

(73) Assignee: Teilch, LLC, Portola Valley, CA (US)

( * ) Notice: Subject to any disclaimer, the term of this patent is extended or adjusted under 35 U.S.C. 154(b) by 354 days.

(21) Appl. No.: 15/633,650

(22) Filed: Jun. 26, 2017

(65) Prior Publication Data

US 2017/0371106 A1    Dec. 28, 2017

Related U.S. Application Data

(60) Provisional application No. 62/354,717, filed on Jun. 25, 2016.

(51) Int. Cl.
| | |
|---|---|
| *G02B 26/00* | (2006.01) |
| *G02B 6/35* | (2006.01) |
| *F21V 8/00* | (2006.01) |
| *G02B 26/08* | (2006.01) |
| *G02B 26/06* | (2006.01) |
| *G02B 6/12* | (2006.01) |

(52) U.S. Cl.
CPC ......... *G02B 6/3512* (2013.01); *G02B 6/0083* (2013.01); *G02B 6/357* (2013.01); *G02B 6/3584* (2013.01); *G02B 26/06* (2013.01); *G02B 26/0825* (2013.01); *G02B 26/0841* (2013.01); *G02B 6/3586* (2013.01); *G02B 2006/12123* (2013.01)

(58) Field of Classification Search
CPC .. G02B 6/3512; G02B 26/06; G02B 26/0825; G02B 26/0841; G02B 6/0083; G02B 6/357; G02B 6/3584; G02B 2006/12123; G02B 6/3586
USPC .......... 310/300, 309; 359/846, 877, 359/341.4–341.44
See application file for complete search history.

(56) References Cited

U.S. PATENT DOCUMENTS

| | | | | |
|---|---|---|---|---|
| 2015/0227204 A1* | 8/2015 | Gipson | ................... | G06F 3/016 345/156 |
| 2017/0347001 A1* | 11/2017 | Ghofrani | ................ | A61B 3/102 |

\* cited by examiner

*Primary Examiner* — Thomas Truong
(74) *Attorney, Agent, or Firm* — Christopher Peil; Law Office of Christopher Peil

(57) ABSTRACT

A deformable mirror and capacitive array controller is capable of controlling a plurality of individual actuators by applying independent voltages from 0V to 240V to each actuator. The device utilizes a distributed microcontroller (MCU) architecture, including a main microcontroller and a plurality of slave microcontrollers to maximize actuator voltage refresh rate. One Slave MCU may be used for up to 384 actuators. For maximizing actuator refresh rate, each Slave MCU may be limited to 192 actuators. The final circuit stage includes a digital/analog converter, a voltage sample and hold and a high voltage amplifier, all packaged in a single integrated circuit. These integrated circuits are referred hereinafter as HV S&H (high voltage sample and hold). A flexible, stacked PCB assembly significantly reduces overall footprint and weight compared to conventional devices. The device's power consumption is nearly an order of magnitude less than that of a conventions adaptive optical system.

20 Claims, 16 Drawing Sheets

600

| Parameter | Min | Typ. | Max | Units | Condition |
|---|---|---|---|---|---|
| High Voltage Outputs | | | | | |
| Active Channels | | 1024 | | | |
| Resolution | | 16 | | Bit | |
| HV Output Current | | | 2.4 | µA | |
| HV Capacitive Load | | 10 | 100 | pF | |
| HV Resistive Load | 100 | 400 | | MΩ | |
| Zero-Code Voltage | | 0.8 | 2.5 | V | |
| Full Scale Voltage | 221 | 225 | | V | |
| Integral Non-Linearity | -0.07 | | +0.07 | % of FSR | |
| Differential Non-Linearity | | ±1 | | LSB | |
| Voltage Temperature Coefficient | | 1 | 5 | mV/°C | |
| AC Crosstalk | | 1.5 | | µV-s | |
| DC Crosstalk | | -80 | | dB | |
| Noise | | 1 | 2 | LSB | 10%-90% FSR |
| Drift | | | ±20 | mV | |
| | | | | | |
| Power Supply | | | | | |
| Supply Voltage | 9 | 12 | 16 | V | |
| Supply Current | | 500 | 667 | mA | |
| Power | | 6 | 8 | W | |

FIG. 6

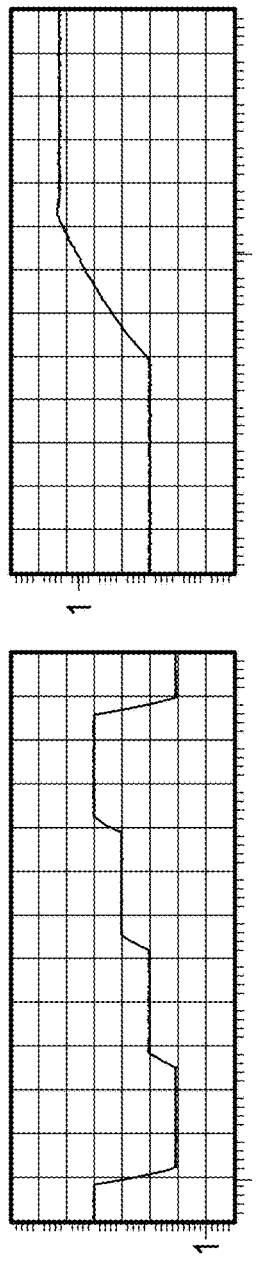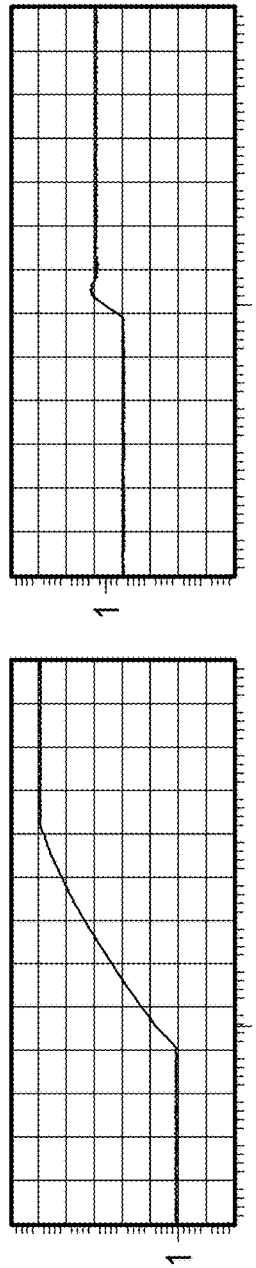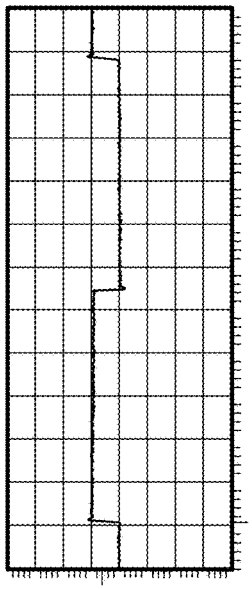

DEFORMABLE MIRROR AND CAPACITIVE ACTUATOR ARRAY CONTROLLER

CROSS REFERENCE TO RELATED APPLICATIONS

This application claims benefit of U.S. provisional patent application Ser. No. 62/354,717, filed Jun. 25, 2016, which is incorporated herein in its entirety by this reference thereto.

BACKGROUND

Technical Field

The present disclosure relates to the field of adaptive optics. More particularly, the present disclosure relates to a deformable mirror and capacitive actuator array controller.

Background Discussion

Present-day adaptive optics are Micro-Electro-Mechanical (MEM) devices containing a mirror and an array of a multiple individual actuators that can each move particular points of the mirror's surface many, many times in a second—a thousand or more, so that these devices can modify their surface thousands of times in a second. Also called deformable mirrors, in the field of astronomy they correct distortion of wavefronts in starlight reaching Earth from millions of light years away that occurs as a result of contact with Earth's atmosphere in the last few miles of their earthward journey.

Adaptive optics and deformable mirrors may be among the most important developments in space imaging. The turbulence encountered by incoming light from space as it enters Earth's atmosphere can cause significant wavefront distortion, thus severely degrading received images. Deformable mirrors make it possible for ground-based telescopes to capture images of similar quality to those captured by space telescopes. These adjustments make it possible to view clearer, sharper images of very faint, very distant objects than is otherwise possible.

The surface of a deformable mirror can be modified to correct distortion in a sensed wavefront. The mirror does this by changing surface contours in real-time in response to wavefront distortion, detected by a wavefront sensor, by eliminating image imperfections resulting from the wavefront distortion. Removing these optical aberrations enables researchers to achieve extremely high-resolution images.

Thus, systems combining deformable mirrors, wavefront sensors and suitable control systems allow astronomers to enhance the quality of the received image by eliminating distortion in incoming wavefronts. The tiny, individual segments are carried on actuators that allow the segments to tilt and tip in milliseconds, allowing each segment many degrees of freedom, thus providing essentially seamless control of the wavefront image.

SUMMARY

A deformable mirror and capacitive array controller is capable of controlling a plurality of individual actuators by applying independent voltages from 0V to 240V to each actuator. The device utilizes a distributed microcontroller (MCU) architecture, including a main microcontroller and a plurality of slave microcontrollers to maximize actuator voltage refresh rate. One Slave MCU may be used for up to 384 actuators. For maximizing actuator refresh rate, each Slave MCU may be limited to 192 actuators. The final circuit stage includes a digital/analog converter, a voltage sample and hold and a high voltage amplifier, all packaged in a single integrated circuit. These integrated circuits are referred hereinafter as HV S&H (high voltage sample and hold). A flexible, stacked PCB assembly significantly reduces overall footprint and weight compared to conventional devices. The device's power consumption is nearly an order of magnitude less than that of a conventional adaptive optical system.

BRIEF DESCRIPTION OF THE DRAWINGS

FIG. 6 provides a table of technical specifications for the device of FIGS. 1 and 2;

FIGS. 11A-11E provide graphs depicting results of performance tests of the device of FIGS. 1 and 2.

DETAILED DESCRIPTION

Figure 1A:
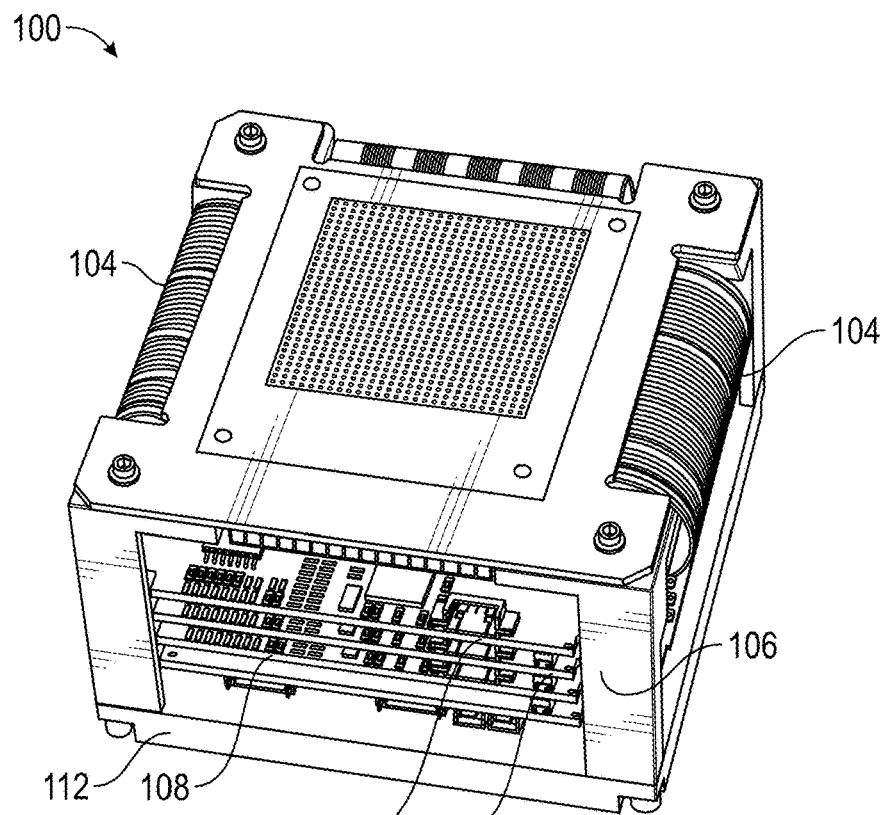
FIGS. 1A and 1B provide views of a capacitive actuator array controller for a deformable mirror.

Abbreviations and Definitions
SPI: serial peripheral interface;
SCLK: serial clock;
SYNC: synchronization event;
$V_{REF}$: reference voltage;
$V_{DD}$: Supply voltage pos;
$V_{ss}$: Voltage at source;
$V_{DDA}$: Supply voltage analog;
$V_{PP}$: Peak-to-peak voltage;
Capacitive load: pf=power factor;
Resistive load: mega ohms;
FSR: feedback shift register;
IRQ: interrupt request line;
MISO: master-in slave out;
MOSI: master out slave in;
AN_AUX: auxiliary port;
DIN: deutsche industrie für normung;
RST: reset;
S_H: sample & hold;
LV: low voltage; and
HV: High voltage.

A deformable mirror and capacitive array controller is capable of controlling a plurality of individual actuators by applying independent voltages from 0V to 240V to each actuator. The device utilizes a distributed microcontroller (MCU) architecture, including a main microcontroller and a plurality of slave microcontrollers to maximize actuator voltage refresh rate. One Slave MCU may be used for up to 384 actuators. For maximizing actuator refresh rate, each Slave MCU may be limited to 192 actuators. The final circuit stage includes a digital/analog converter, a voltage sample and hold and a high voltage amplifier, all packaged in a single integrated circuit. These integrated circuits are referred hereinafter as HV S&H (high voltage sample and hold). A flexible, stacked PCB assembly significantly reduces overall footprint and weight compared to conventional devices. The device's power consumption is nearly an order of magnitude less than that of a conventions adaptive optical system.

A deformable mirror and capacitive actuator array controller (hereinafter the device) is an electronic system capable of controlling from 16 to 10,000 individual actuators by applying independent voltages from 0V to 240V to each actuator. The device embodies a number of innovations, among them:
 a rigid-flex PCB assembly;
 socket thermal isolation;
 a distributed microcontroller architecture,
 standalone operation; and
 system miniaturization.

In embodiments, the device can operate as a stand-alone system in which the only necessary external connection is a power cable. In a stand-alone configuration, preset outputs may be stored in memory with the device keeping a particular configuration as long as it is powered up. Examples of such a configuration would be:
1. to make the deformable mirror flat—the mirror is not flat unless calibrated. The controller sends the calibrated voltages to the actuators; or
2. to correct problems in the optical path. In other words, corrections to alignment and optical path problems can be saved in the controller.

A stand-alone embodiment provides:
 a self-sufficient device; with embedded high voltage generator and low voltage power supplies, digital and analog electronic circuit; and
 the ability to connect a deformable mirror or capacitive actuator array directly to the controller, without external cables or connectors.

In embodiments, the device may be connected to a host computer, in which the host computer receives information from an optical sensor and updates the configuration of the deformable mirror accordingly. In hosted embodiments, a data connection to the host computer may occur over a USB (universal serial bus).

Figure 1B:
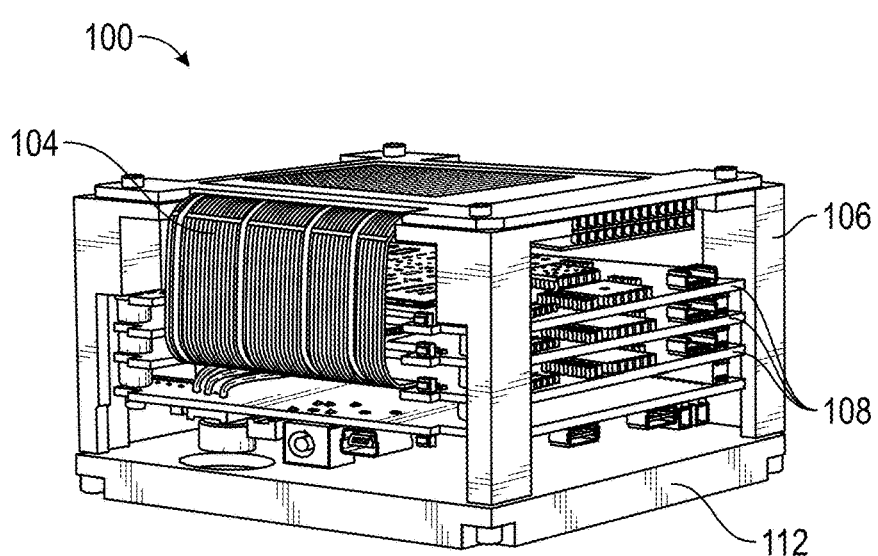

FIGS. 1A and 1B show different views of a capacitive array controller 100 in a configuration for 1024 (main)+25 (aux) actuators. As above, the present device 100 is considerably miniaturized over conventional controllers and has substantially lower power requirements over convention controllers due, significantly to an innovative stackable, folder printed circuit board assembly (PCBA). The PCBA is shown in its stacked, folded configuration in FIGS. 1 and 2 and is shown not-stacked and not-folded in FIG. 7. More will be said about FIG. 7 herein below. One of ordinary skill will appreciate that a deformable mirror having 1024 actuators, effectively, has 1020 actuators. In embodiments, the deformable mirror may be an array of 32×32=1024 actuators. The 4 corners are not active, simply functioning to ground the device. For standardization and to simplify the control signal, the data received includes the 4 corners, but it is ignored by the device.

As shown in FIGS. 1A and 1B the stackable, foldable PCBA includes a plurality of sub-PCBs 108 and a main controller sub-PCB 102 interconnected by a plurality of flex circuits 104. The PCBA architecture including sub-PCBs 108 interspersed with flex circuits 104 allows the entire assembly to be folded in such a way that the resulting stack of sub-PCBs 108 fits within a frame 106, with the sub-PCBs being interspersed with heat sinks and/or metal plates as shown in FIG. 3. Finally, a metal plate 112 is secured to an underside of the frame 106.

The foldable, stackable configuration of the PCBA provides a number of advantages over conventional devices:
 Significantly reduced overall size and weight compared to existing alternatives. In one embodiment, the device measures only 94 mm (l)×94 mm (w)×70 mm (h). Additionally, the device is 175 times smaller, 20 times lighter and consumes 8 times less power that current state of the art controller, Improved reliability and smaller overall footprint;
 Rigid-Flex printed circuit board eliminates high density connectors;
 Better thermal isolation of the socket;
 Elimination of external flat cables; and
 Combination of rigid-flex and stackable circuit boards reduces overall device size. In fact, in an embodiment, the flexible-rigid stackable circuit board keeps the device to a footprint that is only slightly larger than that of the actuator array.

Certain embodiments may utilize a rigid PCBA rather than the flexible PCAB just described.

Figure 2:
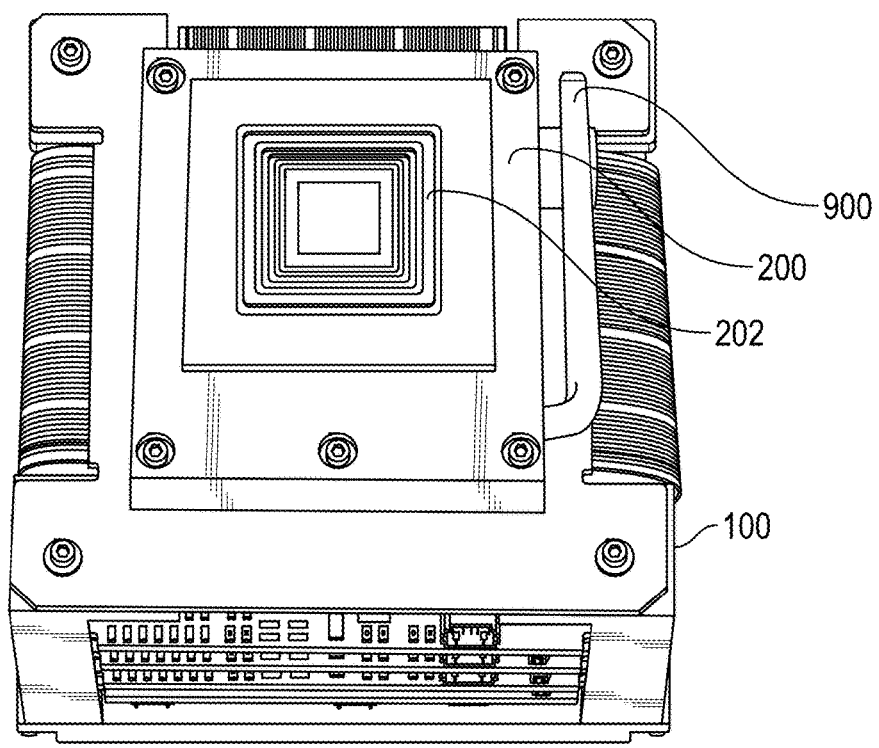
FIG. 2 shows the controller of FIG. 1 with an associated socket and deformable mirror.
Figure 3A:
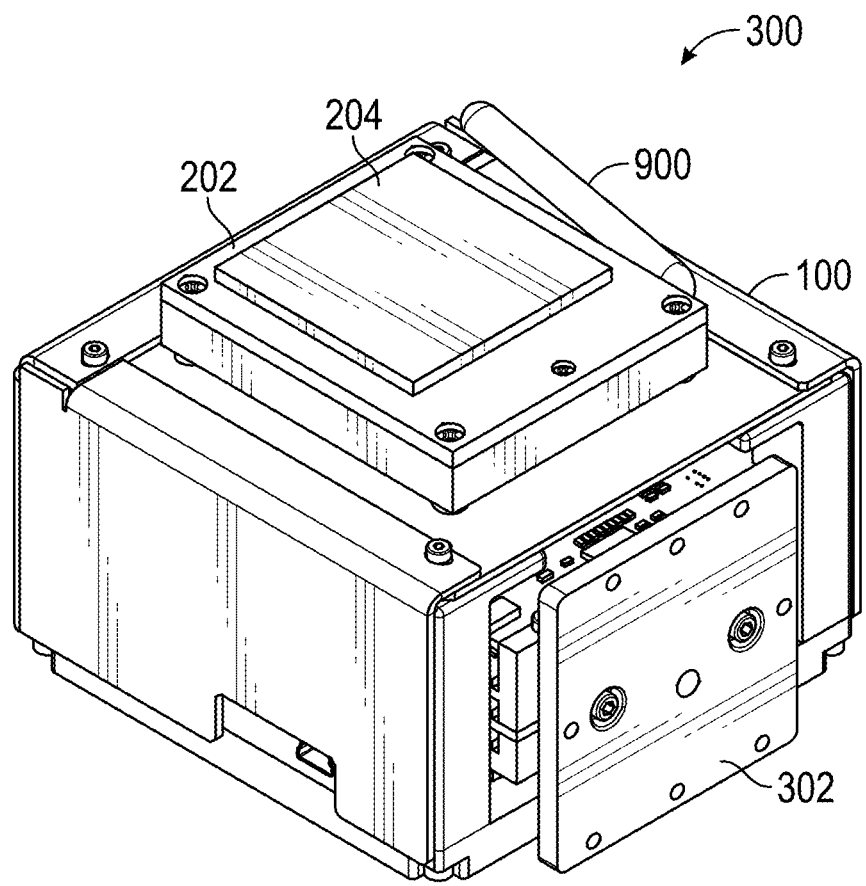
FIGS. 3A-3C provide several views of the mechanical design of the device of FIGS. 1 and 2

FIG. 2 shows the controller 100 with a socket 200 and a deformable mirror 202 coupled to the controller 100. A lock lever 900 for attaching and removing the deformable mirror is associated with the deformable mirror 202. In embodiments, the deformable mirror may be a 1024-actuator deformable mirror. As will be later described, due to the innovative microcontroller architecture, shown in FIG. 4, the controller 100 is scalable to actuator arrays of any size. FIGS. 3A and 3C show further views of the controller 100 with a socket 200 and deformable mirror 204 installed.

Figure 3B:
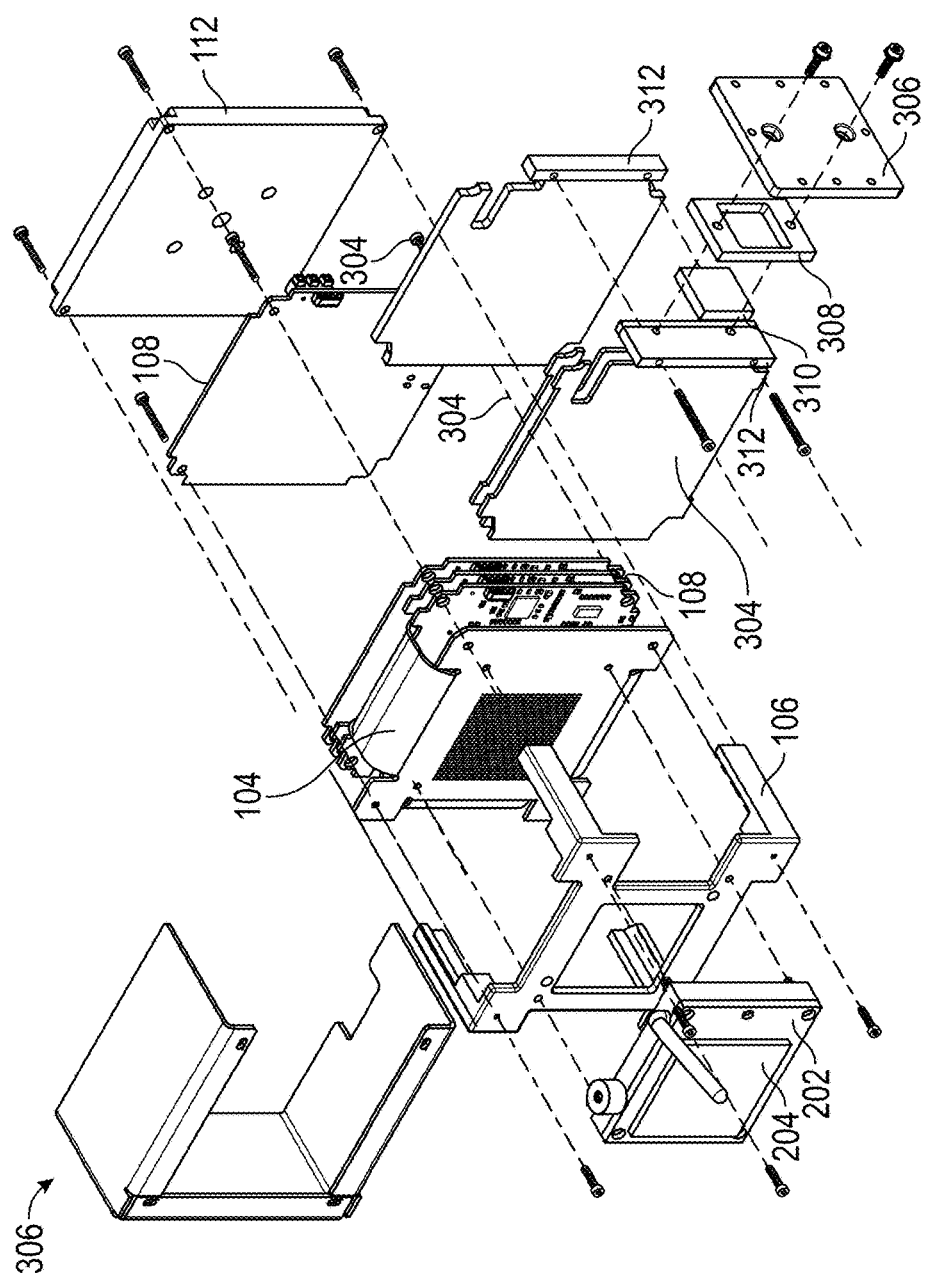
Figure 3C:
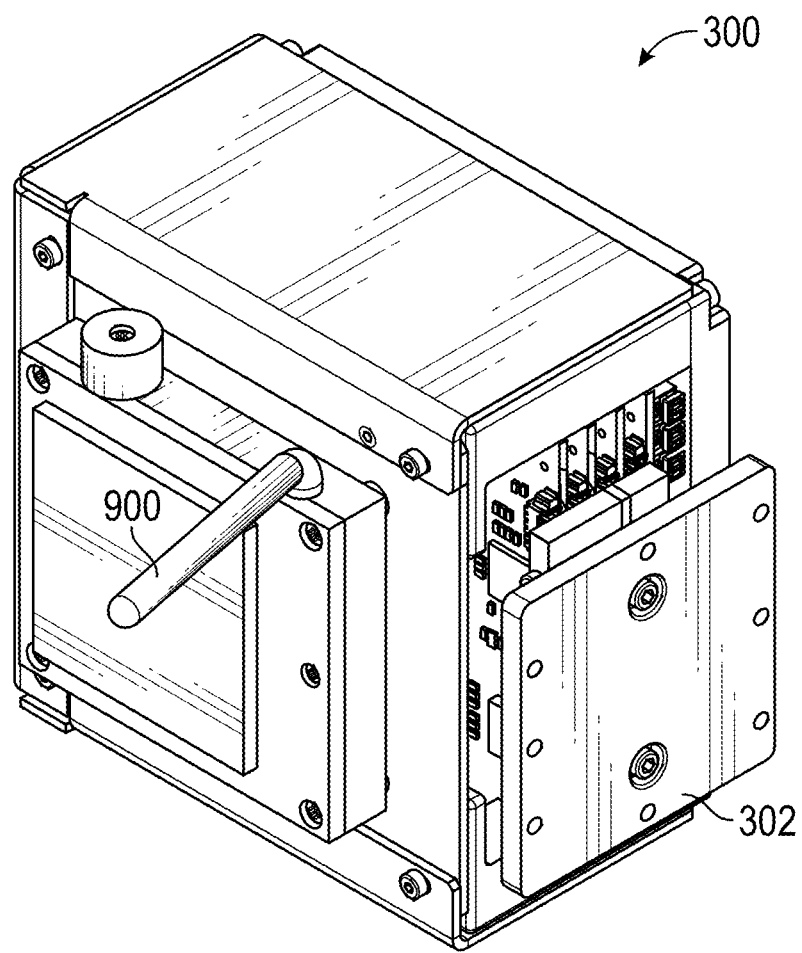

As clearly shown in FIG. 3B, the device may include one or both of active and passive thermal control systems. As shown in FIG. 3B, the frame 106 may unclose the stack of sub-PCBs 108. The sub PCBs 108 may be secured to the frame 106 and the bottom plate 112 by means of a series of fasteners, for example socket head cap screws. A deformable mirror 202 and a socket 204 are coupled to the main controller sub-PCB also by means of suitable fasteners such as socket head cap screws.

Interleaved with the sub PCBs 108 is a series of heat sinks 304. The heat sinks 304 themselves are associated with further heat sinks 312. In contact with the heat sinks 312 is a Peltier device 310, also known as a thermoelectric cooler. An insulator 308 is interposed between the Peltier device 310 and a holder 306. In embodiments, the heat sinks 312, the Peltier device 310, the insulator 301 and the holder are coupled together in a stacked configuration by means of suitable fasteners such as socket head cap screws. It will be appreciated that the heat sinks 312 function as a heat pipe to conduct heat from the heat sinks 304 to the Peltier device 310.

Thus, the embodiment of FIG. 3B incorporates an active thermal control system in which the system is cooled by the Peltier device 310, which is powered and controlled by the controller 100.

A passively cooled system is possible in which thermal control is accomplished only with heat sinks, heat pipes and metal plates.

In either an active system or a passive system, thermal heat plates and heat sinks draw heat directly from PCBA, thus increasing contact area and heat transfer significantly.

In a further embodiment, the device 200 may be actively cooled by a thermal control system driven by an external liquid cooling system.

In embodiments, a plurality of temperature-sensing points with 12-bit resolution allow accurate temperature management. In an embodiment, 19 temperature-sensing points with 12-bit resolution allow accurate temperature management.

In embodiments, the goal of a thermal control system is to keep the operating temperature of the device 200 at or around room temperature. In actual practice, active thermal capabilities as described above can keep the socket temperatures within 0.1° C. of ambient temperature.

In embodiments, the frame 106 may be made either from ceramic or INVAR 36 to control thermal expansion to <1 μm for optical applications.

Figure 4:
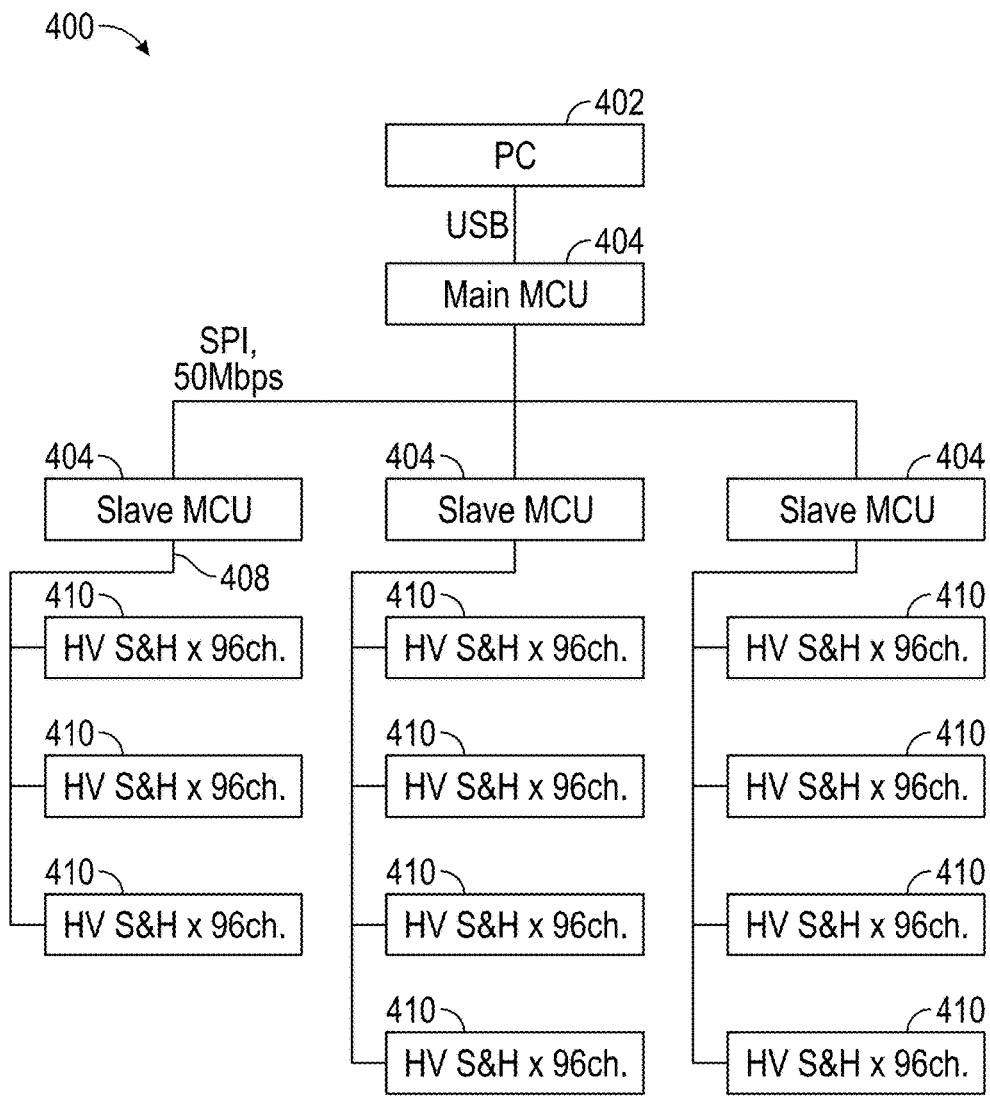
FIG. 4 provides an architecture diagram of the controller of FIG. 1.

Referring now to FIG. 4, the device 200 utilizes a distributed microcontroller (MCU) architecture 400 to maximize actuator voltage refresh rate. In embodiments, the data connection between the device and host PC 402 is a universal serial bus (USB), either USB 2.0 or 3.0, connection. USB Specification 2.0 and 3.0 are incorporated herein in their entireties by this reference thereto.

As shown in FIG. 4, the distributed MCU architecture 400 may include a main microcontroller (MCU) 404, a plurality of slave MCUs 406 and a plurality of high-voltage sample & hold circuits (HV S&H) 410. In embodiments, the main MCU 404 communicates with slave MCUs 406 via an independent and dedicated Serial Peripheral Interface bus (SPI) 412 at 50 mbps. The Serial Peripheral Interface (SPI) bus was developed to provide full-duplex synchronous serial communication between master and slave devices. The SPI bus is commonly used for communication with flash memory, sensors, real-time clocks (RTCs), analog-to-digital converters, and more. The Serial Peripheral Interface Specification is incorporated herein in its entirety, as if fully set forth herein, by this reference thereto. In embodiments, a single slave MCU 406 may be used for up to 384 actuators. However, for maximizing actuator refresh rate, each slave MCU 406 may be limited to 192 actuators. Embodiments limiting each slave MCU to 192 actuators may utilize a rigid PCBA instead of the flexible PCBA herein described.

In its turn, each slave MCU 406 may be communicatively coupled to one or more high-voltage sample & hold circuits (HV S&H) 410. Slave MCUs 406 communicate with the HV S&Hs 410 over a shared SPI bus 408 at 50 mbps.

As shown in FIG. 4, each of the slave MCUs 406 drives a plurality of HV S&Hs 410. In embodiments, one MCU 406 drives 3 HV S&Hs 4010 and the remaining MCUs 406 drive 4 HV S&Hs 410 each. As in FIG. 4, in embodiments, the device may include a total of 11 HV S&Hs 410. Each of the 11 HV S&Hs may drive 96 channels at 0v-225v at 3 khz with up to 16 bits of resolution. 16-bit resolution with 1LSB (low significant bit) of noise is a significant improvement over conventional adaptive optical devices. In fact, during testing at a NASA facility, testers were unable to measure the noise of the device. Its noise level was lower than what could be detected by the test equipment.

Figure 5:
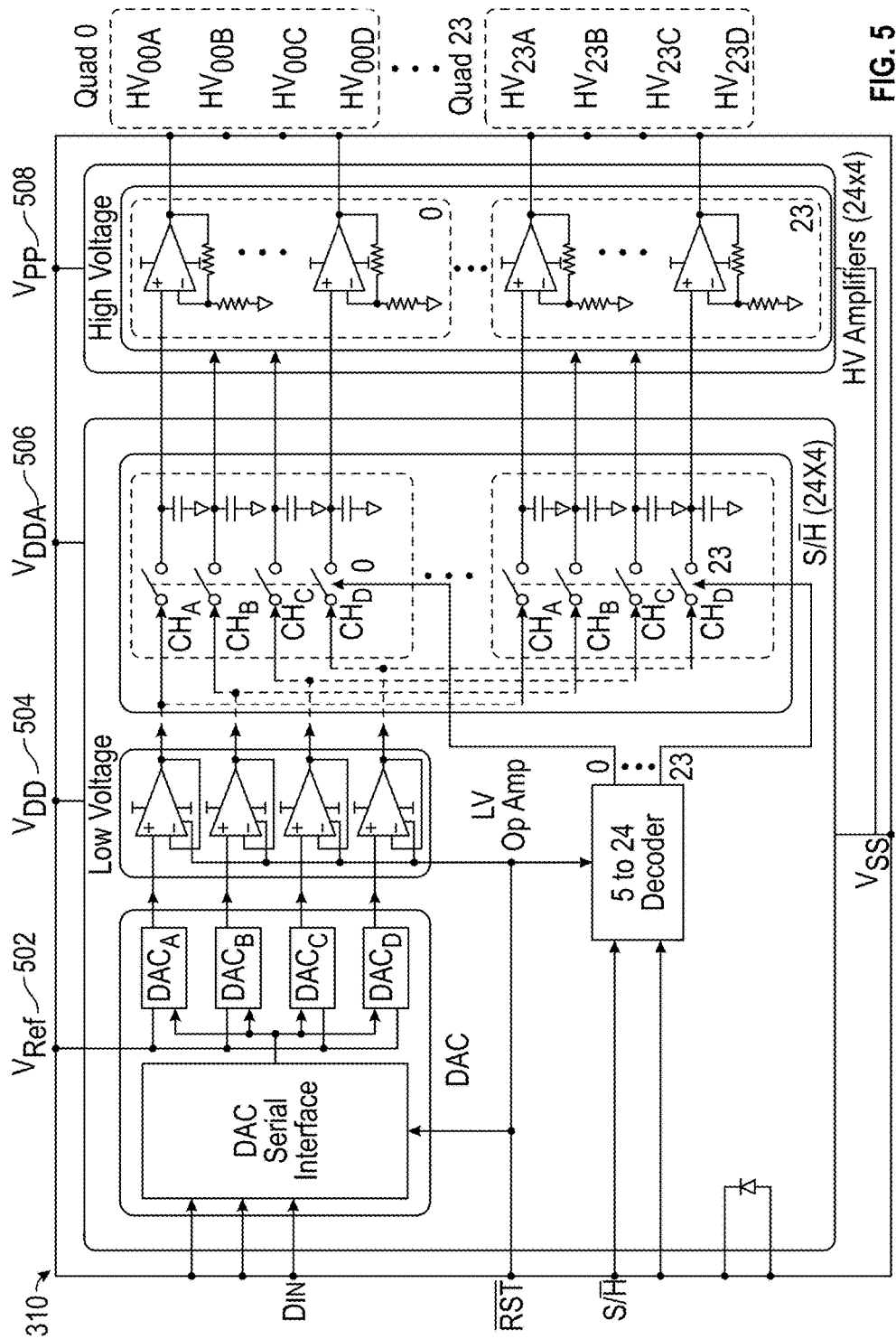
FIG. 5 provides a schematic diagram of a high-voltage sample-and-hold IC (integrated circuit)

As shown in FIG. 5, the final circuit stage 500 includes a digital to analog converter 502, a low voltage amplifier 504, a voltage sample & hold 506 and a high voltage amplifier 508, all packaged in a single integrated circuit. In embodiments, the final circuit stage may be an off-the-shelf Application Specific Integrated Circuit (ASIC) provided by a third party. Utilization of an array of such ASICs provides a low-cost alternative to the development of a single ASIC because the array of smaller ASICs allows emulation of a complex ASIC. The distributed architecture 300 allows each HV S&H 308 to be controlled at high speed. Additionally, other embodiments are possible in which the architecture 300 is scalable to any number of actuators.

The data connection with a host PC may be via USB 2.0 or 3.0, allowing sufficient bandwidth for controlling each actuator at up to 3 kHz. Thus, in a hosted embodiment, a device such as a wavefront analyzer collects data wavefront aberrations, a computer calculates the required correction, the computer sends the required output via USB to the device 200 and the device 200 sends voltage outputs to each individual actuator.

Power Management

The device 200 is a self-sufficient device, with embedded high voltage and low voltage power supplies, digital and analog electronic circuits;

The device contains an embedded high voltage power supply and all other required power supplies (3.3V analog, 3.3V digital, 5V analog, 5V digital, reference (×2);

The device requires only one connection—USB—for controllers of less than 196 actuators. The Device draws power directly from USB; and Only a 12V power supply and USB for data is required for controllers of over 196 actuators.

FIG. 6 provides a table of technical specifications for an embodiment of the device.

Figure 7A:
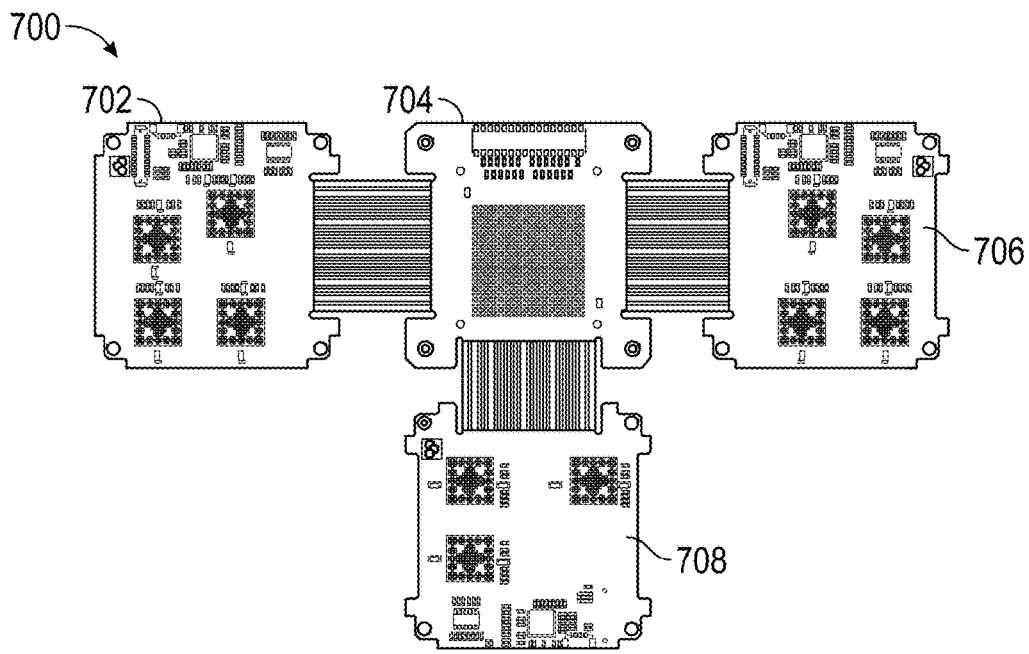
FIGS. 7A-B provide views of a foldable and stackable PCBA for the device of FIGS. 1-3.
Figure 7B:
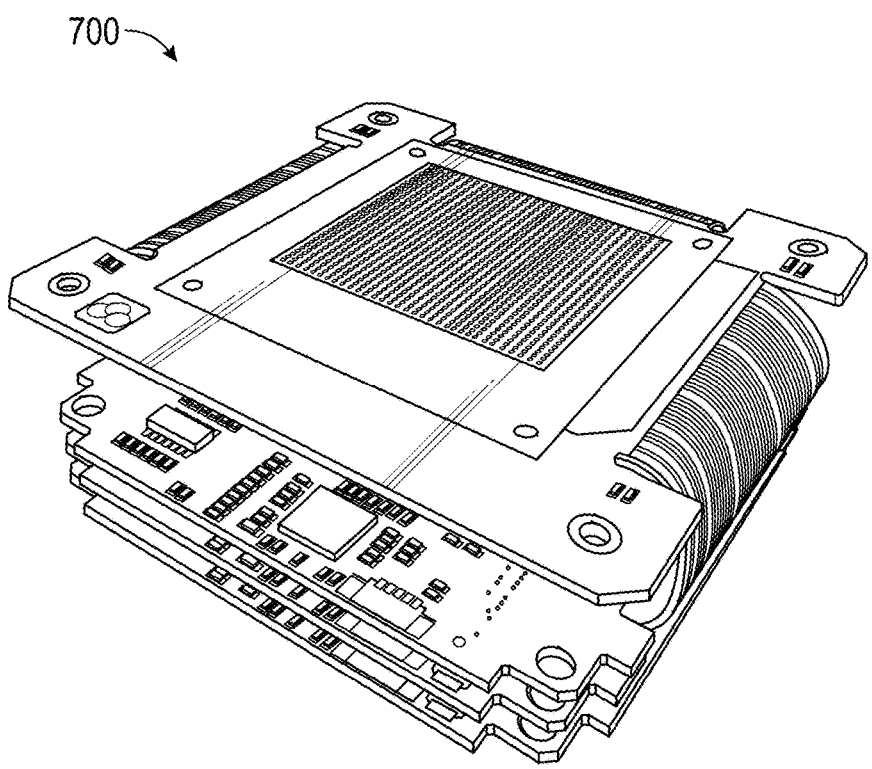

FIG. 7A shows the PCBA 700 laid out flat to better show the arrangement and interconnection of the sub-PCBs and the flex-circuits connecting the sub PCBs to each other. As shown, a first sub-PCB having thereon a main controller is attached to each of three flex-circuits. In turn, the distal end of each of the three flex circuits is connected to another sub-PCB. Two of the sub-PCBs 702 and 706 have thereon 4 slave microcontrollers. The remaining sub-PCB has thereon 3 slave microcontrollers. The present embodiment is not intended to be limiting. In actual fact, the microcontroller architecture can be scaled almost limitlessly.

Figure 8A:
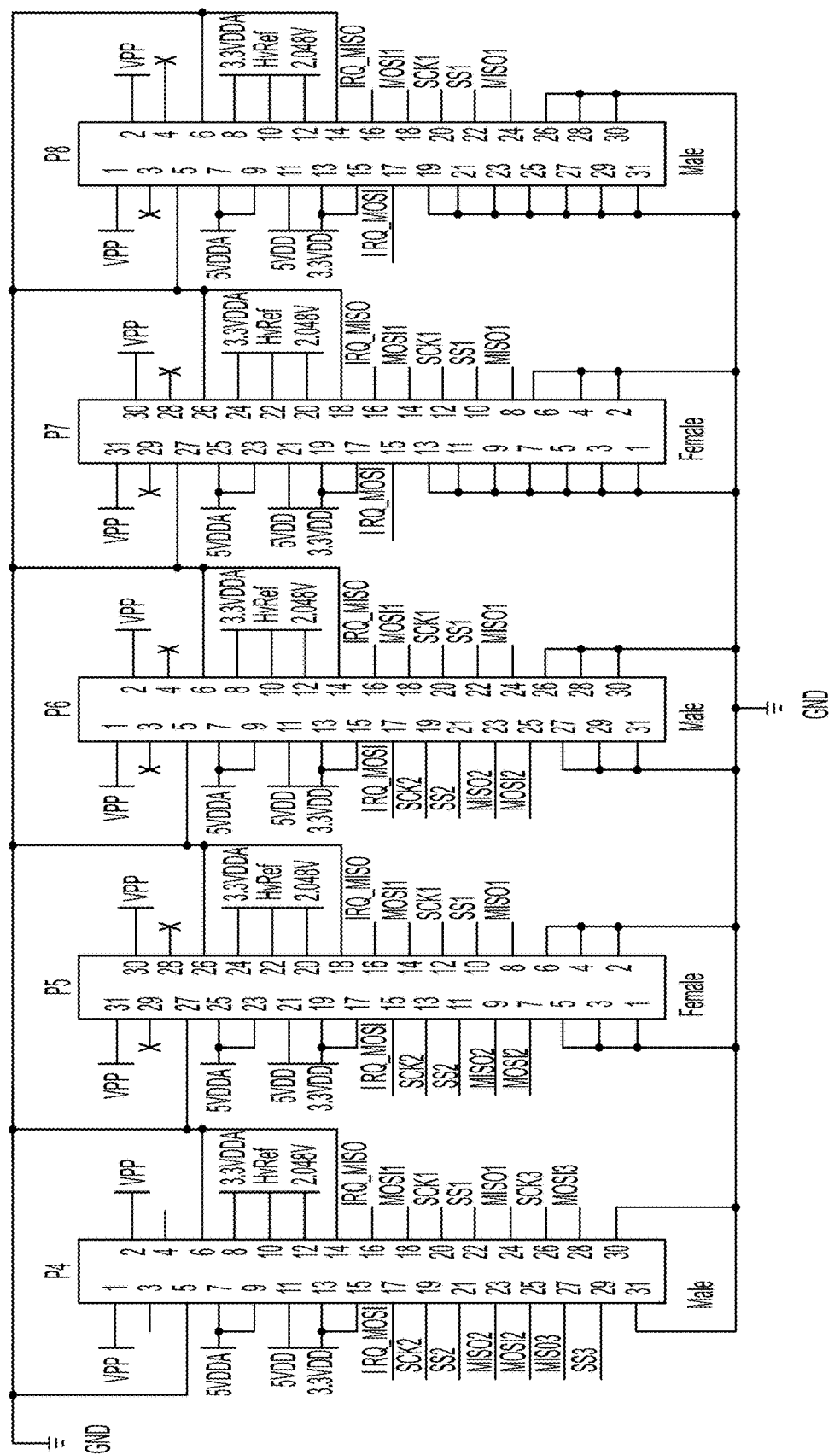
FIGS. 8A and 8B provide schematics of a high voltage socket integration from the device of FIGS. 1-3.
Figure 8B:
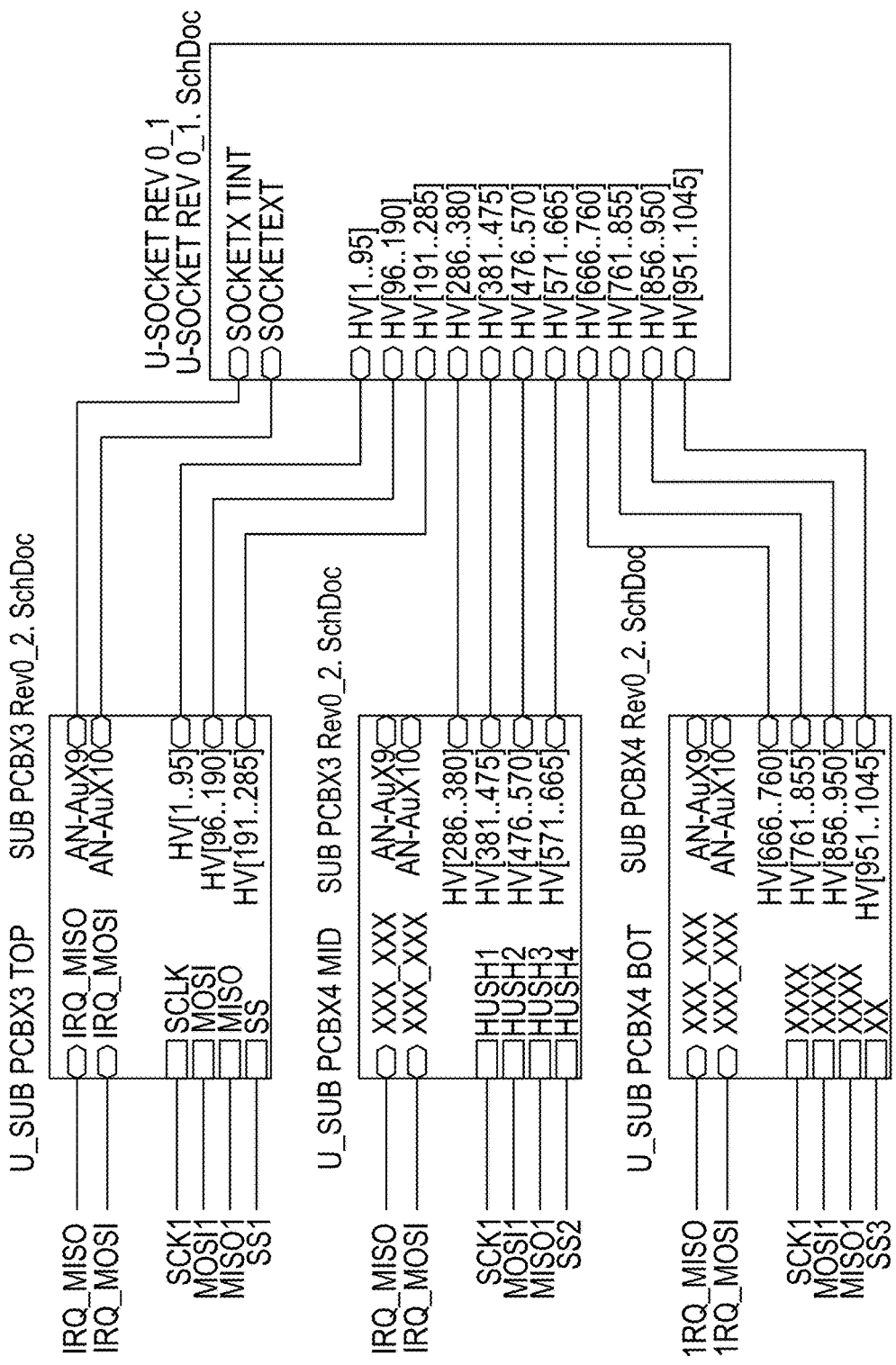

FIGS. 8A and 8B show a high-voltage socket integration schematic. As shown in FIG. 4, the main MCU 404 is connected to a host computer 402 via a USB data connection (FIG. 8A). Also as shown in FIG. 4, the slave MCUs 410 are connected to the main MCU 404 via a serial peripheral interface 408 (FIG. 8B).

Figure 9:
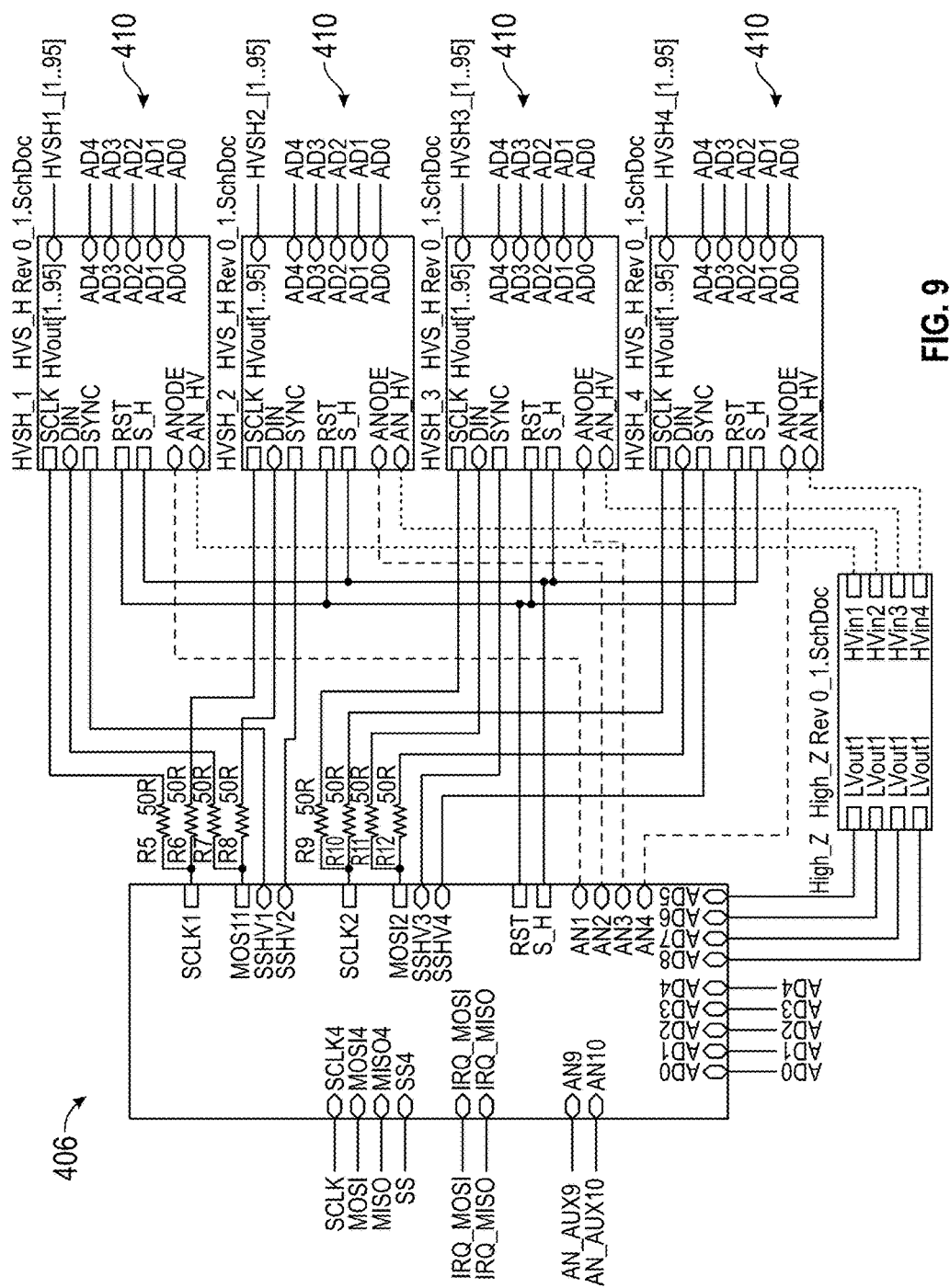
FIG. 9 provides a schematic of a slave MCU (microcontroller) having a plurality of HV S&H (high-voltage sample-and-hold) circuits.

FIG. 9 provides a schematic of a slave MCU (microcontroller) having a plurality of HV S& H (high-voltage sample-and-hold) circuits. In the embodiment shown, the slave MCU has four HV S& H circuits. As shown in FIG. 4 however, one of the slave MCUs has three HV S& H circuits. Other embodiments are possible having greater or fewer or no slave MCUs at all. In addition, the number HV S& H circuits on any slave MCU may be variable.

Figure 10:
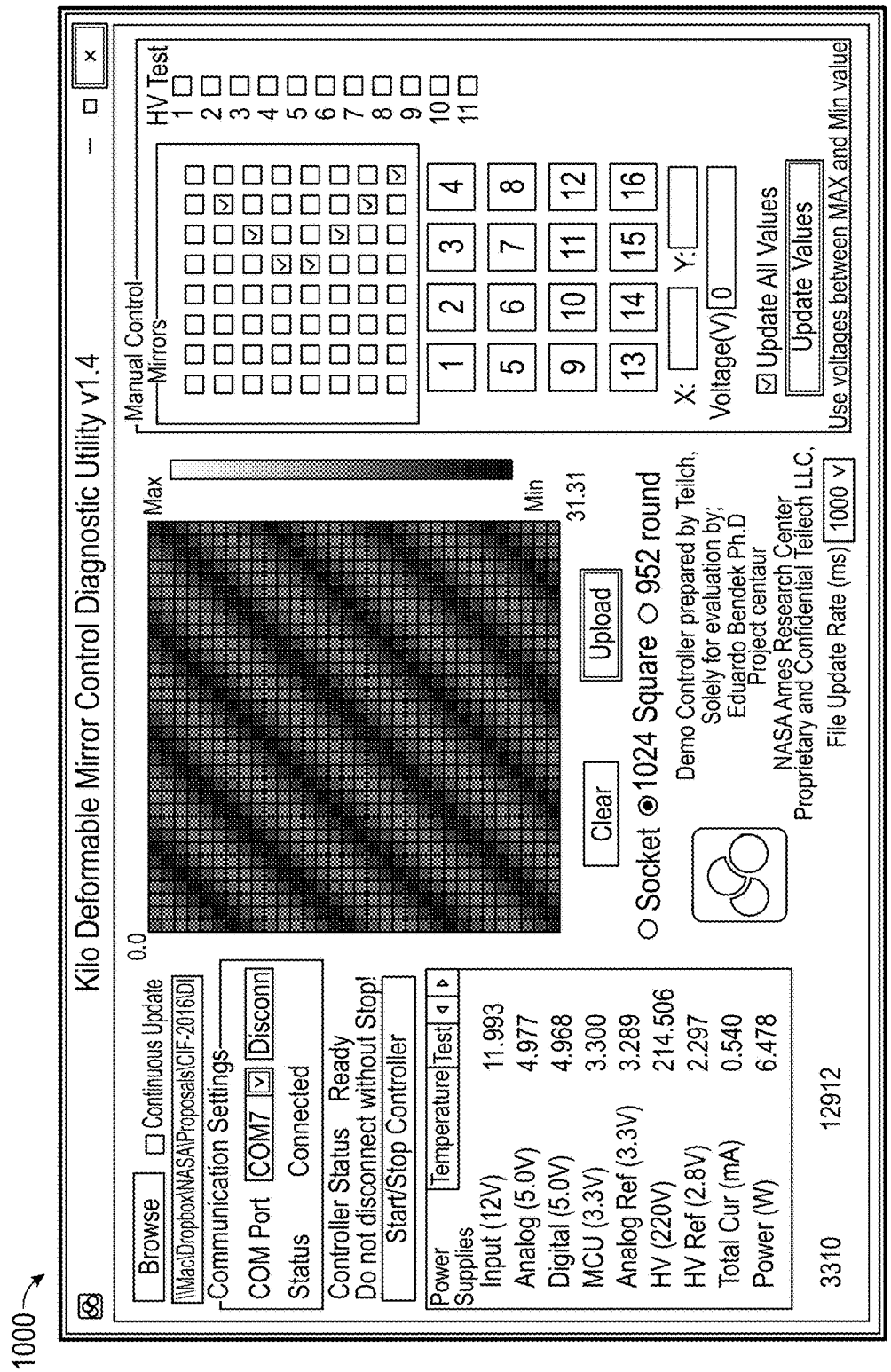
FIG. 10 provides a screenshot of a graphical user interface (GUI) to the device of FIGS. 1-3
Figure 12A:
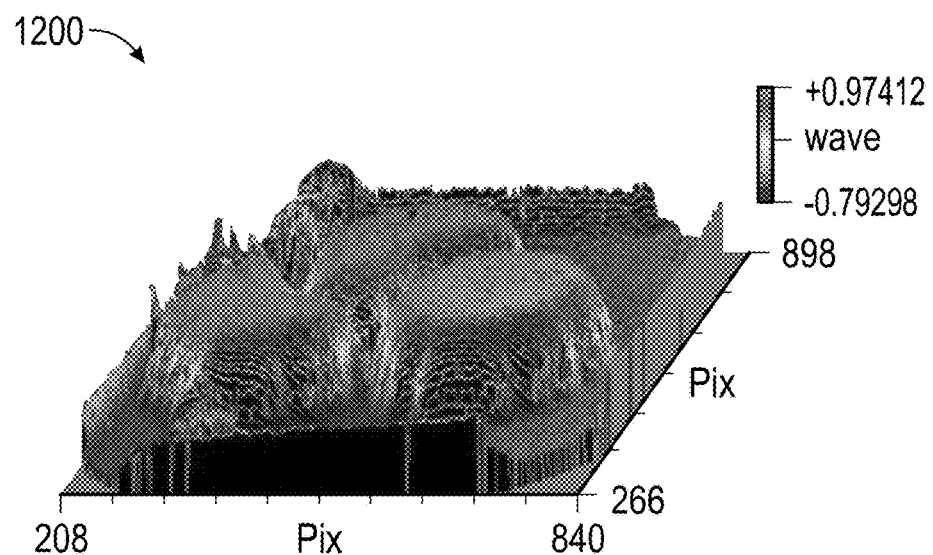
FIGS. 12A-B depict an image created by controlling a 1020-actuator deformable mirror.
Figure 12B:
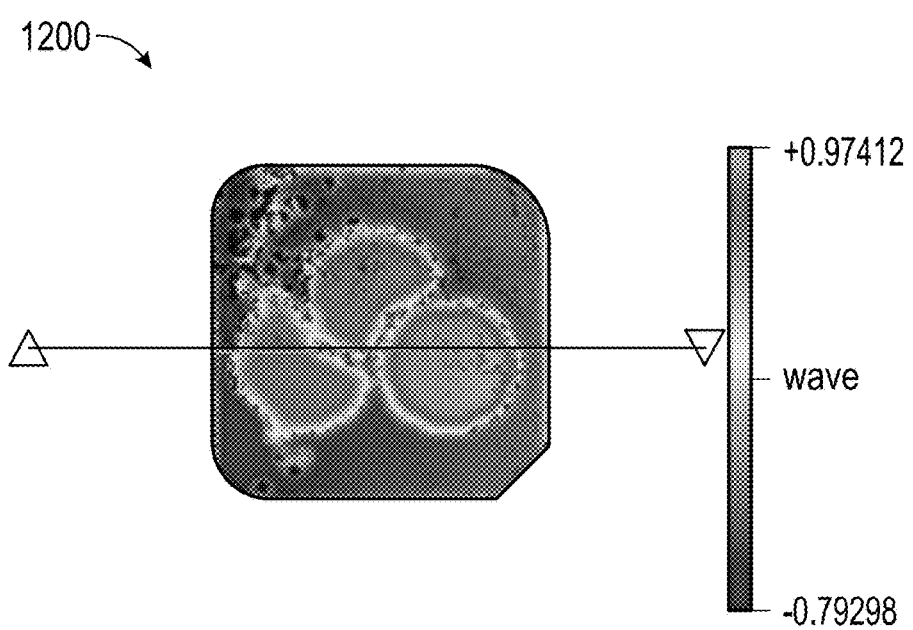

FIG. 10 provides a screenshot of a diagnostic utility for the device of FIGS. 1-3. As shown in FIG. 10, each actuator in the 1024-actuator array of a deformable mirror may be individually controlled using the controls at the right side of the UI (user interface). It will be seen that each mirror segment can be individually controlled by first selecting from among a series of 16 large squares numbered 1-16. Each of the 16 squares contains a sub-array of 64 squares, each small square representing an actuator in the array of 1024 individual actuators in the deformable mirror. FIG. 10 shows 7 individual actuators selected. The actuators having been selected, parameters for each mirror segment may be set using the fields 'x:', 'y:,' and 'voltage:'. In this way, the software allows control of single actuators, groups of actuators or all actuators simultaneously. The practitioner of ordinary skill will readily realize that control of the mirror surface is achieved indirectly through direct control of the actuator associated with a portion of the mirror surface. FIGS. 12A-B show diagrams of an image created by controlling a 1024-actuator deformable mirror in the manner just described.

FIGS. 11A-E provide diagrams summarizing performance testing of an embodiment of the device. The diagrams verify that the particular embodiment satisfies performance specifications for a device of this type.

In Embodiments, the Device can Operate

As a standalone system in which only a power cable is necessary. Preset outputs may be stored in memory so that the device keeps that configuration as long as it is powered up. Examples of this would be to make the deformable mirror flat—the mirror is not flat unless calibrated. The controller sends the calibrated voltages—or to correct problems in the optical path. In other words, alignments and optical path problems can be corrected and saved on the controller; and Connected to a host computer. The computer receives information from an optical sensor and updates the configuration of the DM accordingly. This requires an active data connection via USB.

Figure 13:
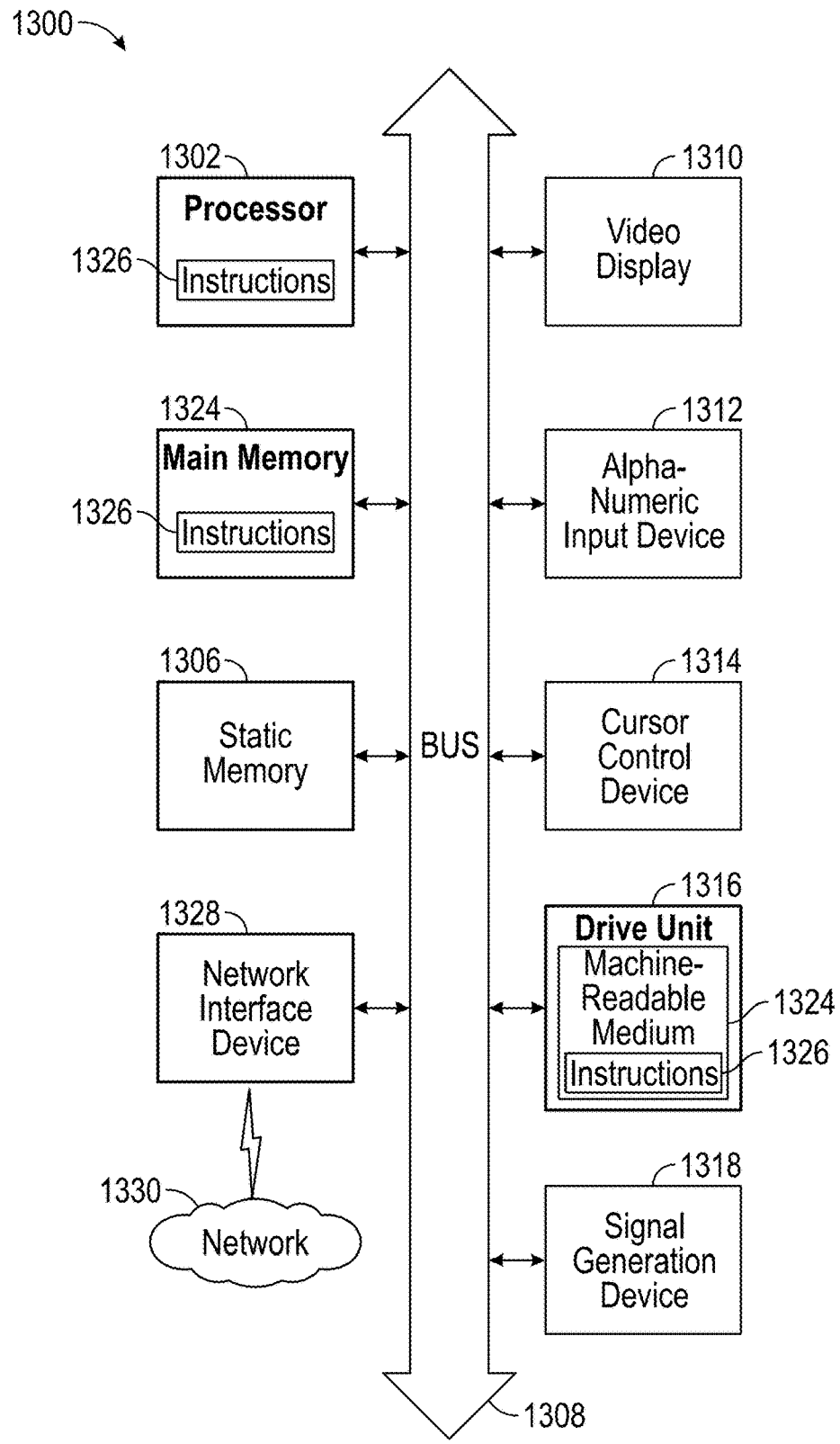
FIG. 13 provides a diagram of a machine in the exemplary form of a computer system within which a set of instructions, for causing the machine to perform any one of the methodologies discussed herein below, may be executed.

Referring now to FIG. 13, shown is a diagrammatic representation of a machine in the exemplary form of a computer system 1300 within which a set of instructions for causing the machine to perform any one of the methodologies discussed herein may be executed. In alternative embodiments, the machine may comprise a network router, a network switch, a network bridge, personal digital assistant (PDA), a cellular telephone, a web appliance or any machine capable of executing a sequence of instructions that specify actions to be taken by that machine.

The computer system 1300 includes a processor 1302, a main memory 1304 and a static memory 1306, which communicate with each other via a bus 1308. The computer system 1300 may further include a display unit 1310, for example, a liquid crystal displays (LCD) or a cathode ray tube (CRT). The computer system 1300 also includes an alphanumeric input device 1312, for example, a keyboard; a cursor control device 1314, for example, a mouse; a disk drive unit 1310, a signal generation device 1318, for example, a speaker, and a network interface device 1328.

The disk drive unit 1316 includes a non-transitory machine-readable medium 1324 on which is stored a set of executable instructions, i.e. software, 1326 embodying any one, or all, of the methodologies described herein. The software 1326 is also shown to reside, completely or at least partially, within the main memory 1304 and/or within the processor 1302. The software 1326 may further be transmitted or received over a network 1330 by means of a network interface device 1328.

In contrast to the system 1300 discussed above, a different embodiment uses logic circuitry instead of computer-executed instructions to implement processing the various methodologies herein described. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large scale integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments of this invention may be used as or to support software programs executed upon some form of processing core (such as the Central Processing Unit of a computer) or otherwise implemented or realized upon or within a machine or computer readable medium. A machine-readable medium includes any mechanism for storing or transmitting information in a form readable by a machine, e.g. a computer. For example, a machine-readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

While the foregoing written description of the embodiments enables one of ordinary skill to make and use a system as described, those of ordinary skill will understand and appreciate the existence of variations, combinations, and equivalents of the specific embodiments, methods, and examples herein. The specification described here should therefore not be limited by the above described embodiments, method, and examples, but by all embodiments and methods within the scope and spirit of the attached claims.

The invention claimed is:

1. A controller for a capacitive actuator array of a deformable mirror comprising:
    a stackable, printed circuit board assembly (PCBA);
    the stackable, PCBA further comprising:
    a distributed microcontroller (MCU) architecture comprising a main microcontroller unit and a plurality of slave microcontroller units communicatively coupled to said main microcontroller unit;
    a plurality of high-voltage sample-and-hold IC's (HV S&H), each slave microcontroller of said plurality of slave microcontrollers supplying control signals to at least one capacitive actuator in said actuator array;
    at least one input for receiving data embodying instructions for controlling actuators of the actuator array; and
    a memory containing program instructions for driving said capacitive actuator array controller.

2. The controller of claim 1, wherein said stackable PCBA is one of:
    a flexible PCBA comprising a plurality of integrated sub PCBs and flex circuits for achieving a compact footprint and form factor; and
    a rigid PCBA.

3. The controller of claim 1, wherein each HV S&H drives 96 channels at 0V-225V at 3 kHz with up to 16 bits of resolution and wherein said distributed architecture is scalable to any number of actuators.

4. The controller of claim 1, wherein each HV S&H comprises a discrete circuit, each of said discrete circuits including:
    a digital to analog converter;
    an op amp;
    a voltage sample and hold; and
    a high voltage amplifier.

5. The controller of claim 4, wherein each discrete circuit comprises a separate application specific integrated circuit (ASIC).

6. The controller of claim 1, wherein said distributed microcontroller architecture comprises an emulation of a single complex application specific integrated circuit (ASIC) by an array of smaller off-the-shelf ASICs.

7. The controller of claim 1, wherein said main controller communicates with each slave controller by means of an independent and dedicated high speed serial peripheral interface (SPI); and
wherein said slave microcontrollers each communicate with associated HV S&Hs via a shared SPI.

8. The controller of claim 1, wherein said distributed MCU architecture is expandable such that it can be scaled to arrays of any number of actuators.

9. The controller of claim 1, further comprising a frame providing a support structure for said stackable, flexible printed circuit assembly, said frame being fabricated from one or more materials that maintain thermal expansion of said frame at or below a predetermined limit.

10. The controller of claim 9, wherein the predetermined limit is 1 µm; and
wherein the one or more materials comprise at least one of:
aluminum;
ceramic; and
INVAR 36.

11. The controller of claim 1, further comprising a system for thermal management capable of maintaining a socket temperature within +/−0.1° C. of ambient temperature, the system for thermal management comprising at least one of:
a temperature sensor that includes a plurality of localized temperature-sensing points; and
at least one heat plate or heat sink capable of drawing heat directly from said PCB assembly.

12. The controller of claim 11, said system for thermal management further comprising:
a Peltier device for eliminating heat drawn directly from said PCB assembly; or
a liquid cooling pump for eliminating heat drawn from said PCB assembly.

13. The controller of claim 1, further comprising an embedded high voltage power supply.

14. The controller of claim 1, wherein the controller has up to 196 actuators draws power directly from a universal serial bus (USB).

15. The controller of claim 1, wherein the controller has over 196 actuators are supplied by a USB and a 12V power supply.

16. The controller of claim 1, further comprising a deformable mirror directly coupled to the controller without cables to form a single compact unit.

17. The controller of claim 1, further comprising a deformable mirror coupled to the controller without cables via a socket to form a single compact unit.

18. The controller of claim 1, wherein said program instructions for driving the capacitive actuator array include program instructions for controlling at least one of:
at least one single actuator;
at least one group of actuators; and
all actuators simultaneously.

19. The controller of claim 1, wherein said controller is capable of controlling from 16 to 4,096 individual actuators by applying independent voltages from 0V to 240V to each actuator.

20. A system comprising:
a capacitive array controller as in claim 1,
a socket coupled to said capacitive array controller; and
a deformable mirror coupled to said socket.

* * * * *